United States Patent
Becker et al.

(10) Patent No.: US 11,463,975 B2
(45) Date of Patent: Oct. 4, 2022

(54) BASE STATION DYNAMIC RANGE EXTENSION

(71) Applicant: MOTOROLA SOLUTIONS, INC., Chicago, IL (US)

(72) Inventors: Christopher J. Becker, Palatine, IL (US); Justin Czarnowski, Elmhurst, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 758 days.

(21) Appl. No.: 15/918,759

(22) Filed: Mar. 12, 2018

(65) Prior Publication Data

US 2019/0281570 A1  Sep. 12, 2019

(51) Int. Cl.
*H04W 56/00* (2009.01)
*H04W 36/18* (2009.01)
*H04W 88/08* (2009.01)

(52) U.S. Cl.
CPC ..... *H04W 56/0045* (2013.01); *H04W 56/005* (2013.01); *H04W 56/0005* (2013.01); *H04W 36/18* (2013.01); *H04W 88/08* (2013.01)

(58) Field of Classification Search
USPC ...................................................... 370/328
See application file for complete search history.

(56) References Cited

U.S. PATENT DOCUMENTS

| 6,577,616 | B1* | 6/2003 | Chaudry | H04B 1/7075 370/342 |
| 8,594,018 | B2* | 11/2013 | Richards | G01S 13/825 342/118 |
| 2001/0009856 | A1* | 7/2001 | Kang | H04B 7/2606 455/456.6 |
| 2006/0246930 | A1* | 11/2006 | Kim | H04B 7/1855 455/504 |
| 2011/0176483 | A1* | 7/2011 | Palanki | H04W 56/0015 370/328 |

FOREIGN PATENT DOCUMENTS

| EP | 2099146 A1 * | 9/2009 | ............ H04J 3/0682 |
| WO | 2006033097 | 3/2006 | |

* cited by examiner

*Primary Examiner* — Alpus Hsu
*Assistant Examiner* — Hooman Houshmand
(74) *Attorney, Agent, or Firm* — Michael Best & Friedrich LLP (57) ABSTRACT

Dynamic range extension of a base station. In one instance, the base station includes a base station modem having a modulator-demodulator, a clock buffer providing an advanced time signal to the modulator-demodulator, a receiver buffer coupled between the modulator-demodulator and a transceiver, a transmitter buffer coupled between the modulator-demodulator and the transceiver, and an electronic processor. The electronic processor is configured to determine a first amount by which to modify a range of a service region of the base station. The electronic processor is also configured to introduce a first delay in the receiver buffer corresponding to the first amount and introduce a second delay in the transmitter buffer corresponding to the first amount.

15 Claims, 7 Drawing Sheets

BASE STATION DYNAMIC RANGE EXTENSION

BACKGROUND OF THE INVENTION

Cellular communication is carried out using mobile communication devices (for example, smart telephones, portable radios, and the like) and base stations. A base station and a surrounding area within which the mobile communication devices connect to the base station are referred to as a cell. A cell generally has a fixed service region having a shape and dimensions. A mobile communication device on the border of a cell may be connected to the base station of the cell or a base station of a neighboring cell. When a mobile communication device moves between a first cell and a second cell, the mobile communication device is transferred to the second cell via a handoff. In urban areas where base stations are densely populated, handoff is typically smooth and results in very few dropped connections between the mobile communication device and base stations. In rural areas where base stations are sparsely populated, handoffs may result in more dropped connections or a mobile communication device may enter a dead zone where no base station provides cellular coverage.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, handoffs between neighboring base stations may result in dropped calls. In addition, the mobile communication device may enter a dead zone. Therefore, a need exists to provide additional coverage area and better handoff in areas where base stations may be sparsely populated.

Typically, a base station includes a fixed service region, commonly referred to as a cell, within which a mobile communication device may connect to the base station. In some areas, neighboring base stations may not provide continuous coverage over between the cells of the base stations. That is, a dead zone may exist where the mobile communication device cannot connect to either of the neighboring base stations. When the mobile communication device enters the dead zone, the mobile communication drops a call or connection to external or cellular networks. As a consequence, the handoff between neighboring cells is not smooth and results in a call being dropped. One solution to the above problem is to provide additional base stations to eliminate dead zones. However, adding more base stations may be very expensive and may not be feasible based on geographical or other concerns.

Another solution for improving handoff and coverage characteristics of base stations is to statically or dynamically extend the range of service region of the base stations. Base stations establish a connection and communicate with mobile communication devices within a service region of the base station by first sending a random signal to the mobile communication device and then listening for a response within a fixed time window. In one example, a range of the base station may be increased by increasing the fixed time window within which the base station listens to a response. However, from the perspective of the mobile communication device, the random signal will be out of synchronization resulting in a poor connection.

To address the above disadvantages, embodiments as described below allow for advancing a signal sent by the base station and delaying the time window for listening to a response from the mobile communication device. As a consequence, a range of a base station may be extended without affecting a synchronization of the mobile communication device.

One embodiment provides a base station modem for dynamic range extension of a base station. The base station modem includes a modulator-demodulator configured to be coupled to a transceiver of the base station and a clock buffer configured to receive a universal time source time and to provide a clock signal to the modulator-demodulator. The clock signal is an advanced time of the universal time source time. The base station modem also includes a receiver buffer coupled between the modulator-demodulator and the transceiver configured to receive data signals from the transceiver and provide the data signals to the modulator-demodulator and a transmitter buffer coupled between the modulator-demodulator and the transceiver configured to receive data signals from the modulator-demodulator and provide the data signals to the transceiver. The base station modem further includes an electronic processor coupled to the modulator-demodulator, the clock buffer, the receiver buffer, and the transmitter buffer. The electronic processor is configured to determine a first amount by which to modify a range of a service region of the base station. The electronic processor is also configured to introduce a first delay in the receiver buffer corresponding to the first amount and introduce a second delay in the transmitter buffer corresponding to the first amount.

Another embodiment provides a method for dynamic range extension of a base station. The method includes determining, with an electronic processor of a base station modem of the base station, a first amount by which to modify a range of a service region of the base station and introducing, with the electronic processor, a first delay in a receiver buffer coupled between a modulator-demodulator of the base station modem and a transceiver of the base station. The first delay corresponds to the first amount. The method also includes introducing, with the electronic processor, a second delay in a transmitter buffer coupled between the modulator-demodulator and the transceiver. The second delay corresponds to the first amount.

Figure 1:
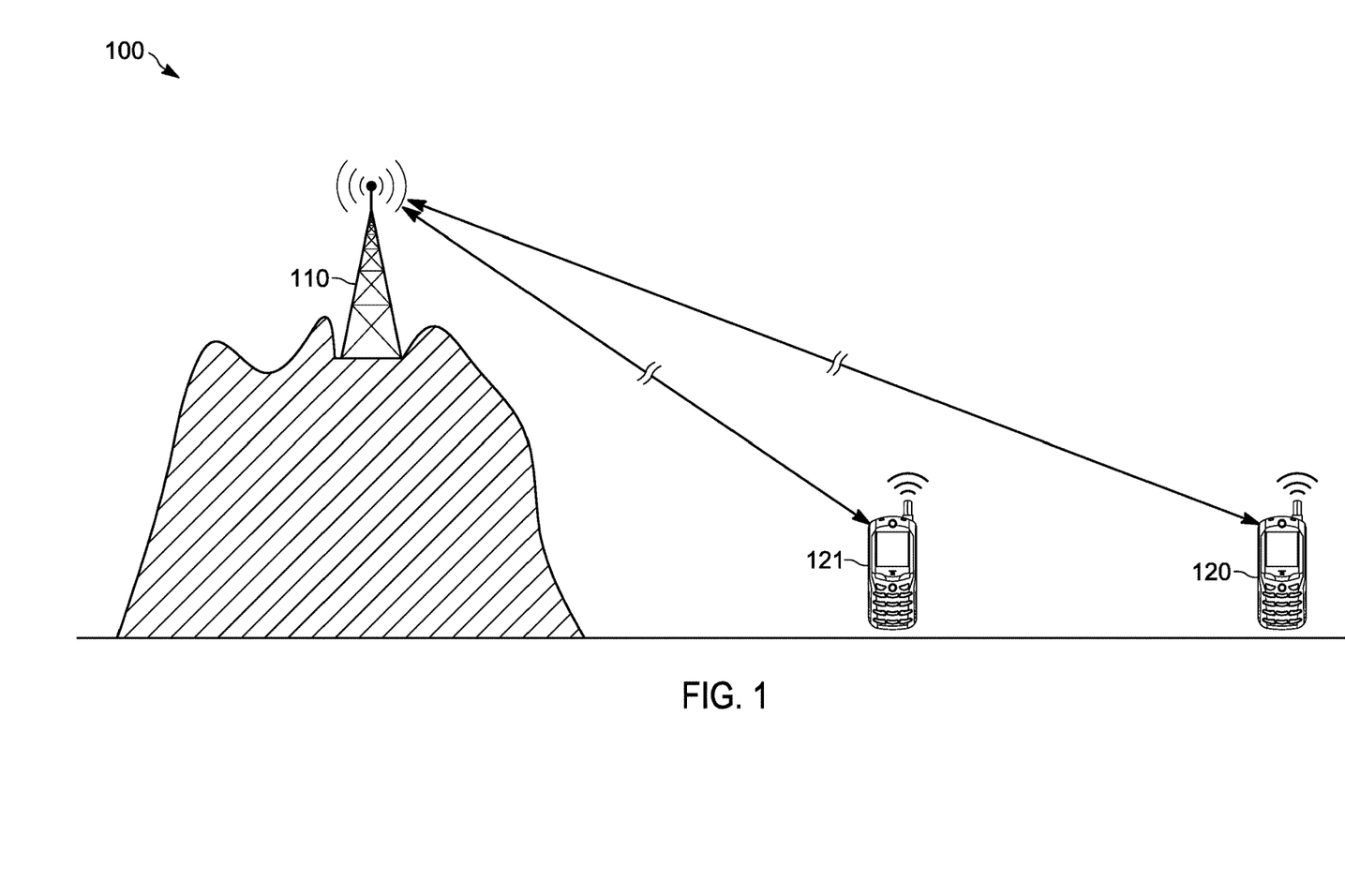
FIG. 1 illustrates a cell including a base station and a mobile communication device in accordance with some embodiments.

FIG. 1 illustrates a cell 100 including a base station 110 and mobile communication devices 120 and 121. The base station 110 provides wireless communication coverage (for example, cellular coverage) to the mobile communication devices 120 and 121. The base station 110 is, for example, a CDMA base station, a universal mobile telecommunications system (UMTS) base station, a microsite or a similar transceiver station of a telecommunications node. The mobile communication device 120 is, for example, a two-way radio, a smart telephone, a tablet computer, a laptop computer, a vehicle-mounted radio, a drone-mounted radio, a modem, a relay, and the like. The mobile communication device 120 is, in some instances, also referred to as a subscriber device or a User Equipment (UE). Mobile communication devices 120 and 121 communicate with each other via voice and data communications sent to one another via the base station 110.

The base station 110 provides wireless communication coverage to mobile communication devices 120 that are within a service region of the base station 110. Although the terms cell and service region may be used to describe similar concepts, there are some differences between the two. As described above, a cell is a collection of the base station 110 and its connected mobile communication devices, in this example, mobile communication devices 120 and 121. A service region of the base station 110 is an area within which a mobile communication device 120 is capable of connecting to the base station 110. A mobile communication device 120 can belong to only one cell, whereas the mobile communication device 120 may be in the service region of more than one base station. The base station 110 communicates with a mobile communication device, for example, the mobile communication device 120, by generating a pseudo-noise code or pseudo-random-noise code (PN code) and transmitting the PN code to the mobile communication device 120. The base station 110 listens to a response to the transmitted PN code within a fixed time window. The response to the PN code may be another PN code that is transmitted by a mobile communication device 120. A mobile communication device 120 is within the service region of the base station 110 when the response to the PN code is received within the fixed time window. As a consequence, the service region (and the cell) varies with the length of the fixed time window and the environmental factors affecting propagation of the PN code.

Figure 2A:
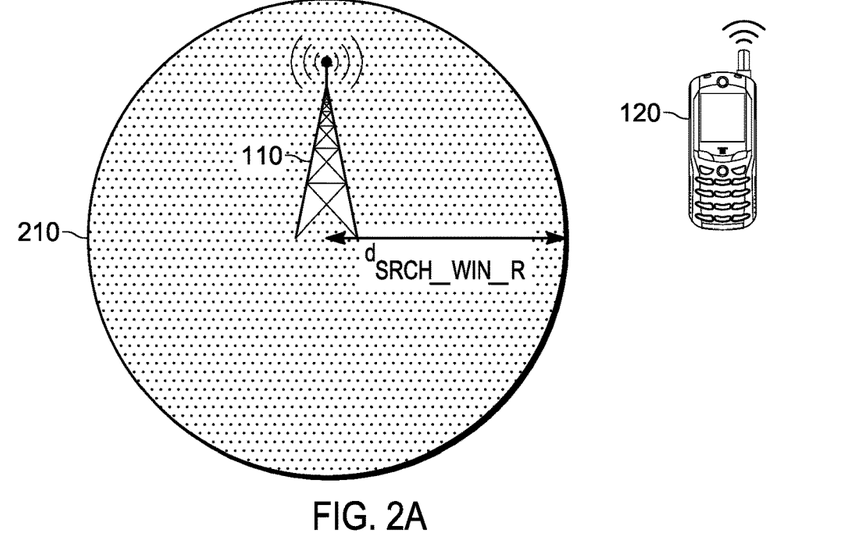
FIGS. 2A-2B illustrate a static range extension of a service region of a base station in accordance with some embodiments.
Figure 2B:
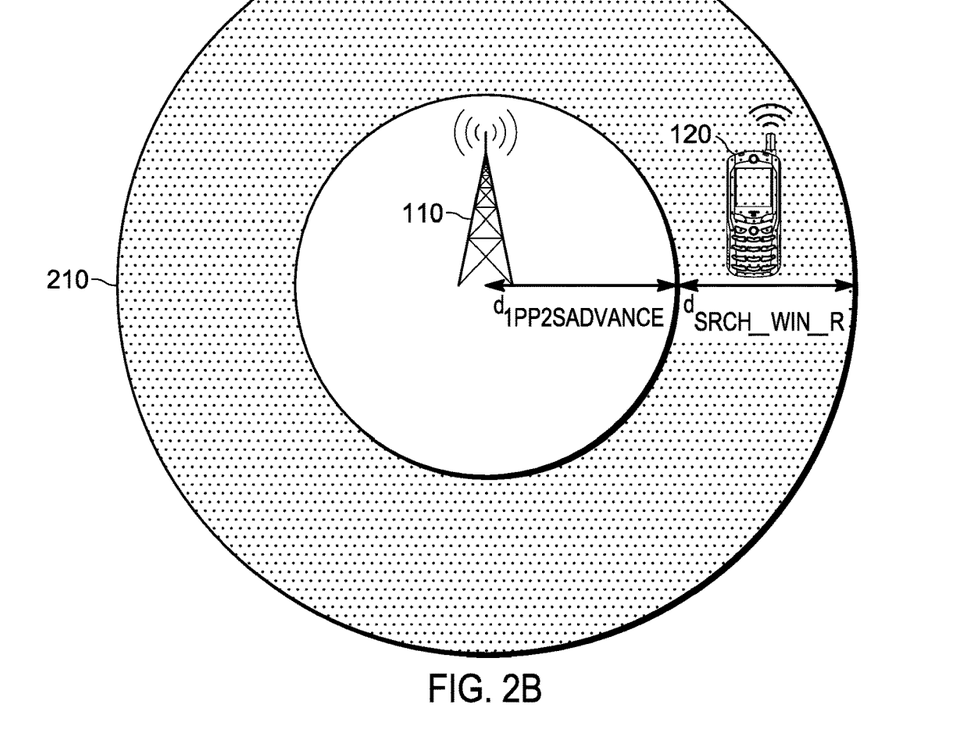

FIG. 2A illustrates a service region 210 of the base station 110. In the example illustrated, the mobile communication device 120 is outside the service region 210 of the base station 110. That is, even if the mobile communication device 120 receives the PN code from the base station 110, the response to the PN code from the mobile communication device 120 does not reach the base station 110 within the fixed time window. As a consequence, the mobile communication device 120 cannot communicate, or is not covered under the wireless communication coverage provided by the base station 110. FIG. 2B illustrates a statically extended service region 210 of the base station 110. In this example, the mobile communication device 120 is within the extended service region 210 of the base station 110. The service region 210 may be extended by manipulating the time window for response as described below with respect to FIGS. 3-4. As a consequence, the mobile communication device 120 may communicate with the base station 110 even though the mobile communication device 120 is outside the original service region 210 of the base station 110.

Figure 3:
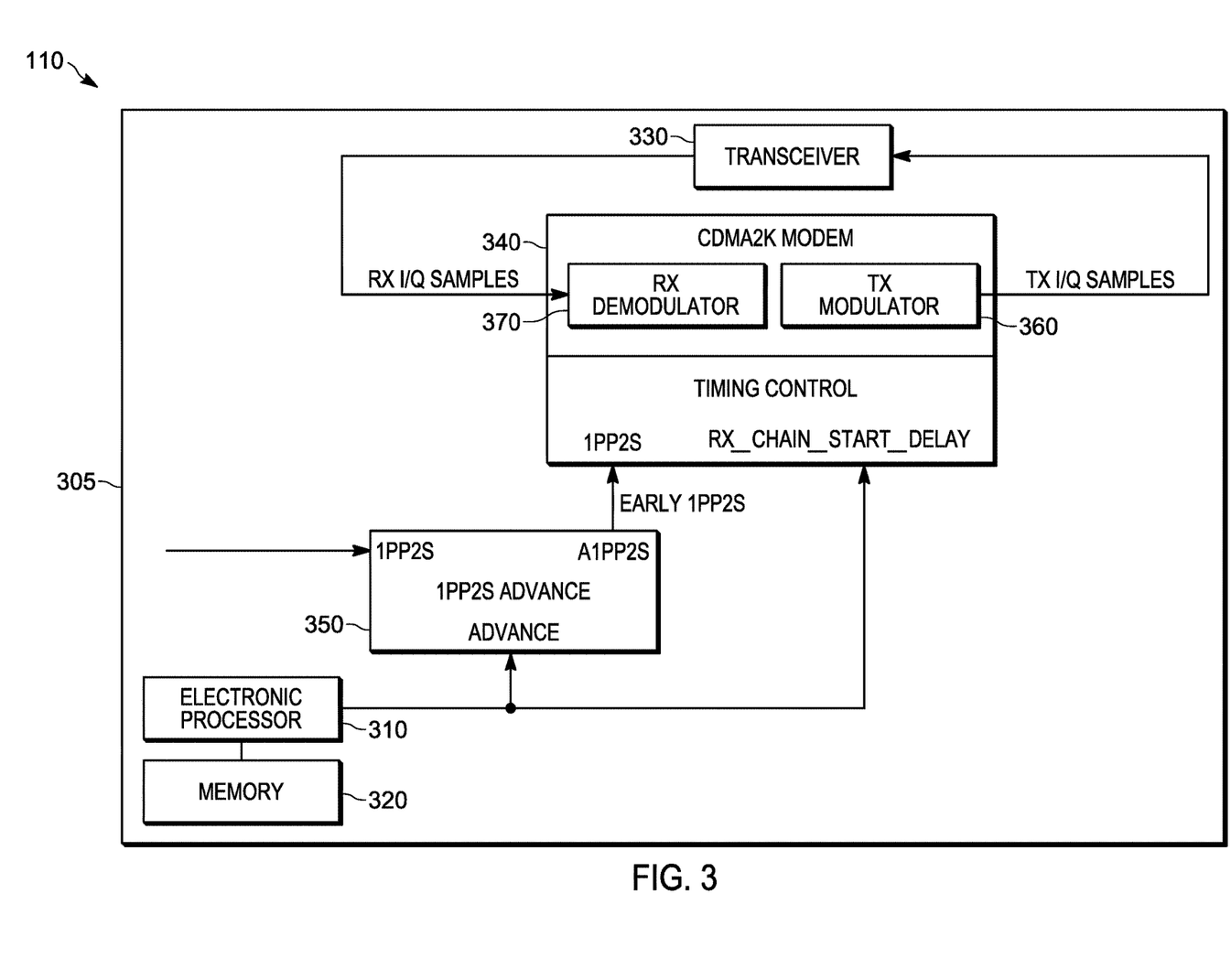
FIG. 3 is a block diagram of a base station modem in accordance with some embodiments.

FIG. 3 is a simplified block diagram of a base station modem 305 of the base station 110. In the below description, base station 110 and the base station modem 305 may be used interchangeably. The base station modem 305 resides in the base station 110 and provides the functionality of the base station 110. The base station 110 may include a single base station modem 305 for a plurality of sectors or may include a plurality of base station modems 305 each handling one or more sectors of the plurality of sectors. In the example illustrated, the base station modem 305 includes an electronic processor 310, a memory 320, a transceiver 330, a modulator-demodulator 340, and a clock buffer 350. The base station modem 305 may include more of fewer components than those illustrated in FIG. 3. In some embodiments, the electronic processor 310 is implemented as a microprocessor with separate memory, for example, the memory 320. In other embodiments, the electronic processor 310 is implemented as a microcontroller or digital signal processor (with memory 320 on the same chip). In other embodiments, the electronic processor 310 is implemented using multiple processors. In addition, the electronic processor 310 may be implemented partially or entirely as, for example, a field-programmable gate array (FPGA), an application specific integrated circuit (ASIC), and the like and the memory 320 may not be needed or be modified accordingly. In the example illustrated, the memory 320 includes non-transitory, computer-readable memory that stores instructions that are received and executed by the electronic processor 310 to carry out the functionality of the base station modem 305 described herein. The memory 320 may include, for example, a program storage area and a data storage area. The program storage area and the data storage area may include combinations of different types of memory, for example, read-only memory and random-access memory.

The transceiver 330 enables wireless communication between the base station 110 and external networks (for example, a cellular network) and between the base station 110 and the mobile communication devices 120. In some embodiments, rather than a transceiver 330, the base station modem 305 includes separate transmitting and receiving components, for example, a transmitter and a receiver.

The modulator-demodulator 340 is coupled to the transceiver 330 to transmit and receive wireless signals. Particularly, the modulator-demodulator 340 generates the PN sequence and modulates the PN sequence to a PN code using a transmitter modulator 360. The PN code is sent to the transceiver 330 to be transmitted to mobile communication devices 120. The modulator-demodulator 340 receives a response to the PN code through the transceiver 330 and demodulates the response using the receiver demodulator 370.

The clock buffer 350 receives a universal time source time, for example, a coordinated universal time (UTC), a global positioning system time (True GPS time), a Long Range Navigation time (LORAN-C), Temps Atomique International time (TAI) and the like. The universal time source time may be received as a one pulse per two seconds (1pp2s) signal. That is, the clock buffer 350 receives one pulse every two seconds. The clock buffer 350 provides an advanced clock signal (a1pp2s) (for example, clock signal) to the modulator-demodulator 340. The advanced clock signal (a1pp2s) is an advanced version or an advanced time of the universal time source time (that is, the universal time source is buffered by an advance amount). An advance amount of the universal time source time is determined by the electronic processor 310, which provides an advance signal to the clock buffer 350. The clock buffer 350 generates the advanced clock signal (a1pp2s) based on the advance signal received from the electronic processor 310. The clock buffer 350 may also be used to generate clock signals for the components of the base station modem 305. Although the clock buffer 350 receives the universal time source time at one pulse per two seconds, the clock buffer 350 may generate clock signals (for example, system clock signals) for the components at a much faster rate. That is the interval between system clock signals is much smaller than the interval (that is, two seconds) between the universal time source time signals. This allows for the components to oversample the signals transmitted from and received by the base station 110.

The electronic processor 310 also provides a receiver delay signal (RX_chain_start_delay) to the modulator-demodulator 340. The modulator-demodulator 340 suspends listening to a response to a PN code until the receiver delay signal expires. The advance signal and the receiver delay signals are multiples of the interval between system clock signals.

Figure 4:
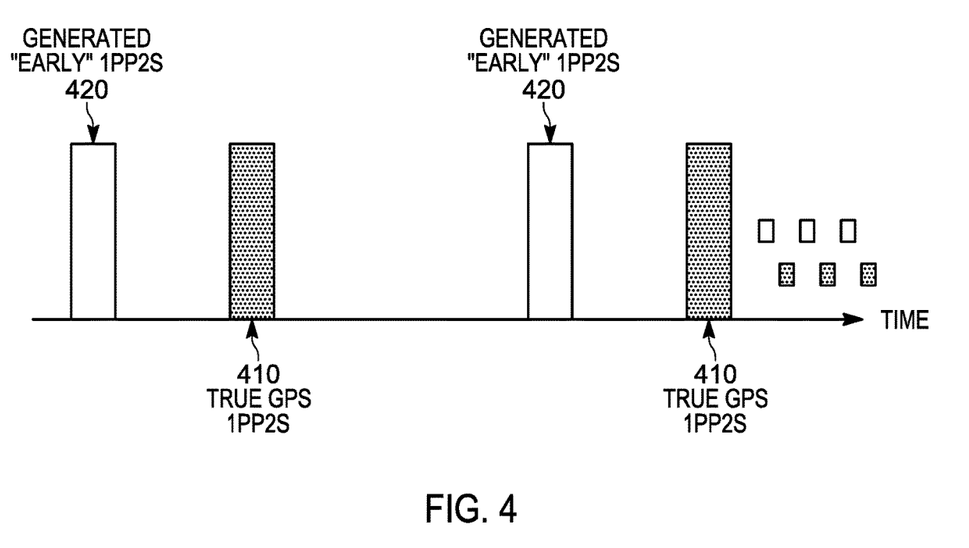
FIG. 4 illustrates manipulation of a time widow for static range extension of a base station in accordance with some embodiments.

FIG. 4 illustrates a difference between universal time source time signals 410 (True GPS 1pp2s) and advanced clock signals 420 (early 1pp2s). During an un-extended operation of the base station 110, there is no delay between the universal time source time signal 410 and the advanced clock signal 420. The modulator-demodulator 340 begins transmission of a PN code to a mobile communication device 120 at every universal time source time signal 410. The modulator-demodulator 340 then listens for a response to the PN code from the mobile communication device 120 until the next universal time source time signal 410. That is, the modulator-demodulator 340 listens for the response within the fixed time window (for example, two seconds) between successive universal time source time signals 410. The mobile communication device 120 is within the service region 210 of the base station 110 when the modulator-demodulator 340 begins receiving the response from the mobile communication device 120 within the fixed time window (see FIG. 2).

A range of the service region 210 may be extended by advancing the universal time source time. The electronic processor 310 determines a first amount by which to extend the range of the service region 210. The electronic processor 310 provides the advance signal to the clock buffer 350 and the receiver delay signal to the modulator-demodulator 340 corresponding to the first amount. A mapping between the first amount, the advance signal, and the receiver delay signal may be stored in the memory 320.

The modulator-demodulator 340 receives the advanced clock signal 420 from the clock buffer 350. The modulator-demodulator 340 begins transmission of the PN code at every advanced clock signal 420. However, the modulator-demodulator 340 suspends listening to the PN code until the receiver delay signal expires. The receiver delay signal is selected to expire when the next universal time source time signal 410 is received. The modulator-demodulator 340 listens for a response to the PN code sent when the advanced clock signal 420 is received in the time window between the next two successive universal time source time signals 410. In other words, the time window for listening to the response to the PN code is delayed by the receiver delay signal. Accordingly, by buffering the universal time source time, the range of the service region 210 of the base station 110 can almost be doubled.

The above described static range extension of the base station 110 provides several advantages over other methods of range extensions. Particularly, by beginning transmission of the PN code earlier than the reception time window, the PN code and the response signals are synchronized from the perspective of the mobile communication device 120. Particularly, since only the base station 110 is modified to manipulate the reception time window, the timing of the mobile communication device 120 may be disturbed. By advancing the transmission of the PN code and delaying the reception time window, the timing of the mobile communication device 120 is maintained.

Figure 5A:
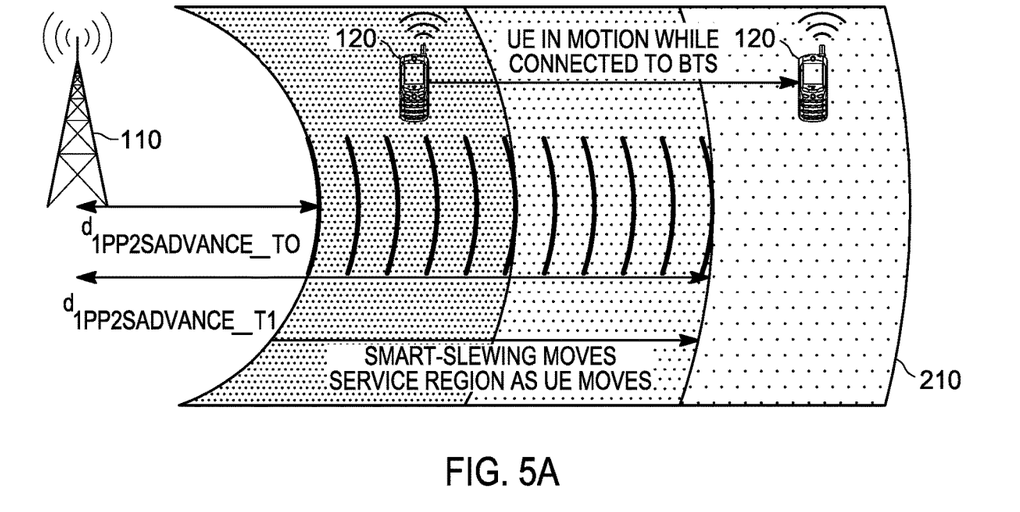
FIGS. 5A-5B illustrate a dynamic range extension of a service region of a base station in accordance with some embodiments.
Figure 5B:
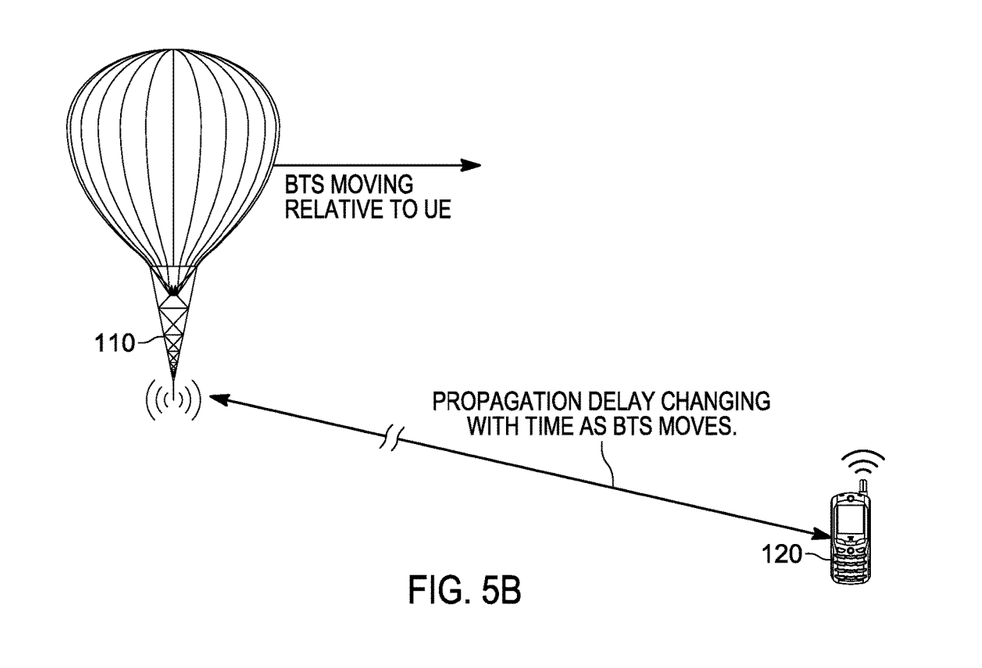

Although static range extension is effective in expanding the range of the service region 210 of the base station 110, when the range needs to be subsequently changed, the base station 110 requires re-initialization of system timer (that is, the clock buffer 350). Mobile communication devices 120 and 121, by their nature, are mobile and move between cells. In areas where base stations are sparsely populated, the range of the service region 210 may need to be dynamically adjusted to provide a smooth handoff between neighboring cells. FIGS. 5A-5B illustrate movement between the base station 110 and the mobile communication device 120. In FIG. 5A, the base station 110 is stationary, but the mobile communication device 120 moves relative to the base station 110 while still connected to the base station 110. In FIG. 5B, the mobile communication device 120 is stationary, but the base station 110 moves relative to the mobile communication device 120 while the mobile communication device 120 is still connected to the base station 110. Dynamic range extension of the base station 110 is explained below with respect to FIGS. 6-7.

Figure 6:
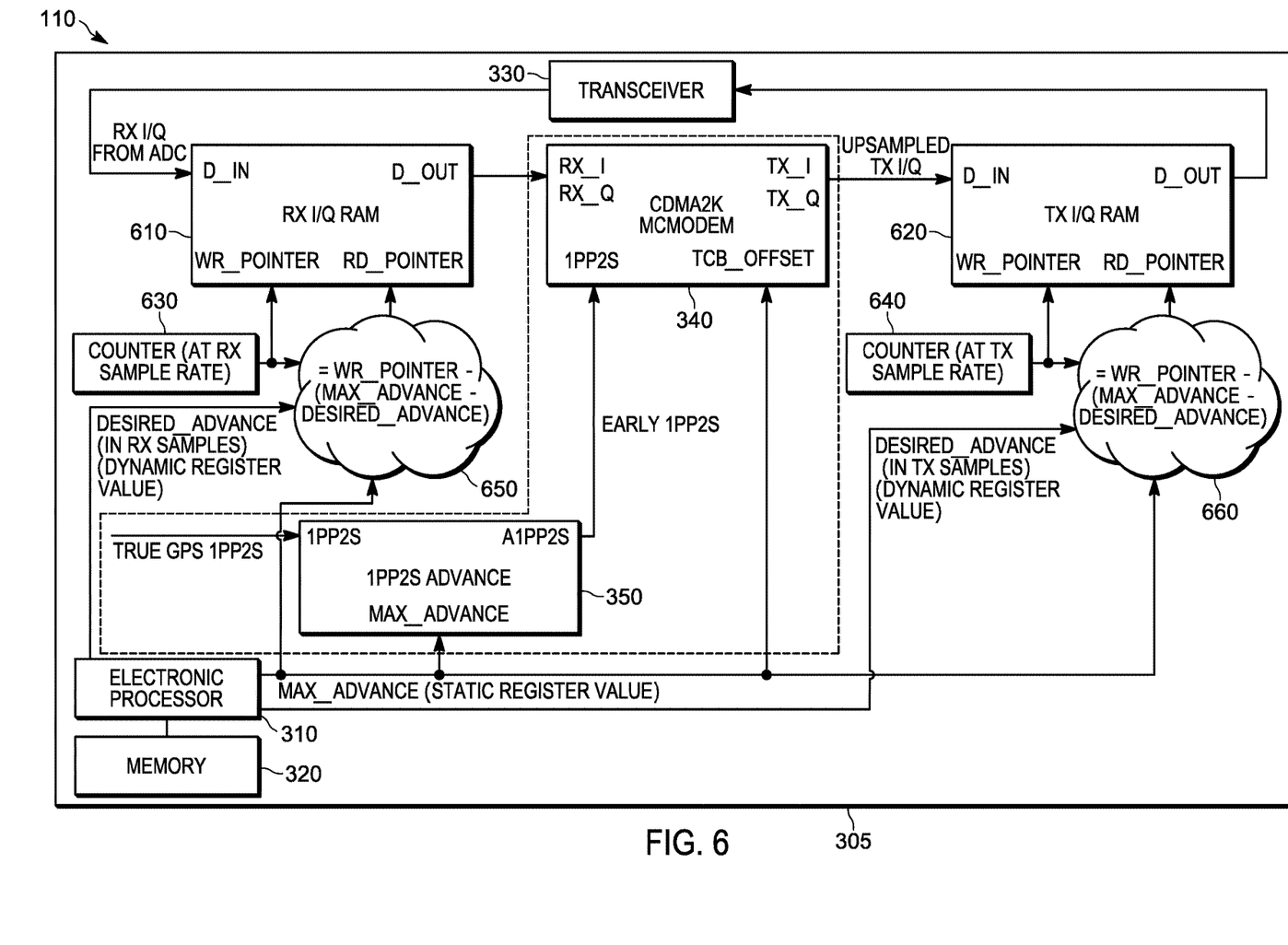
FIG. 6 is a block diagram of a base station modem in accordance with some embodiments.

FIG. 6 is a simplified block diagram of the base station modem 305 of the base station 110. The base station modem 305 is similar to the base station modem 305 described in FIG. 3. In the example illustrated, the base station modem 305 additionally includes a receiver buffer 610, a transmitter buffer 620, a receiver counter 630, a transmitter counter 640, a receiver pointer 650, and a transmitter pointer 660. The base station modem 305 may include more or fewer components than those shown in FIG. 6.

The receiver buffer 610 is coupled between the transceiver 330 and the modulator-demodulator 340. In the example illustrated, the receiver buffer 610 is a random access memory (RAM)-based circular buffer that stores and retrieves receiver quadrate baseband (IQ) samples (for example, data signals) from the transceiver 330. The receiver IQ samples are buffered before being provided to the modulator-demodulator 340. The transmitter buffer 620 is coupled between the modulator-demodulator 340 and the transceiver 330. In the example illustrated, the transmitter buffer 620 is a RAM-based circular buffer that stores and retrieves transmitter IQ samples (for example, data signals) from the modulator-demodulator 340. The transmitter IQ samples are buffered after being produced by the modulator-demodulator 340 but before being provided to the transceiver 330. The receiver IQ samples and the transmitter IQ samples are oversampled (that is, sampled at the system clock rate) signals of the received signals and the transmitter signals respectively.

The receiver counter 630 provides a write pointer to the receiver buffer 610. In some embodiments, the receiver counter 630 is implemented within the electronic processor 310. The receiver counter 630 provides the write pointer at the sample rate of the receiver component of the transceiver 330. The transmitter counter 640 provides a write pointer to the transmitter buffer 620. In some embodiments, the transmitter counter 640 is implemented within the electronic processor 310. The transmitter counter 640 provides the write pointer at the sample rate of the transmitter component of the transceiver 330.

The receiver pointer 650 provides a read pointer to the receiver buffer 610. In some embodiments, the receiver pointer 650 is implemented within the electronic processor 310. The receiver pointer 650 provides the read pointer based on the write pointer provided by the receiver counter 630 and a desired advance signal provided by the electronic processor 310. For example, the read pointer may be determined based on the formula: Read Pointer=Write Pointer−(Maximum Advance—Desired Advance). The transmitter pointer 660 provides a read pointer to the transmitter buffer 620. In some embodiments, the transmitter pointer 660 is implemented within the electronic processor 310. The transmitter pointer 660 provides the read pointer based on the write pointer provided by the transmitter counter 640 and the desired advance signal provided by the electronic processor 310. For example, the read pointer may be determined based on the formula: Read Pointer=Write Pointer−(Maximum Advance—Desired Advance). The maximum advance and the desired advance are multiples of the system clock interval.

In some embodiments, the receiver counter 630 and the transmitter counter 640 provide the read pointer to the receiver buffer 610 and the transmitter buffer 620 respectively. In these embodiments, the receiver pointer 650 and the transmitter pointer 660 provide the write pointer to the receiver buffer 610 and the transmitter buffer 620 respectively. The receiver pointer 650 and the transmitter pointer 660 may be adjusted such that the write pointer is provided based on the read pointer and the desired advance signal.

The base station 110 may be used to dynamically adjust the range of the service region 210. First, the electronic processor 310 introduces a maximum advance in the clock buffer 350 such that the range of the service region 210 is at a maximum extension range. The electronic processor 310 then introduces a delay (for example, maximum advance—desired advance) in the receiver buffer 610 and the transmitter buffer 620 to decrease the range of the service region 210 to correspond to the distance between the base station 110 and the mobile communication device 120 (for example, a first amount). Maximum advance in the clock buffer 350 corresponds to advancing the universal time source time signal 410 to the maximum possible amount such that the advanced clock signal 420 is still provided after the previous 420. Referring to FIG. 4, maximum advance in the clock buffer 350 corresponds to the second advanced clock signal 420 being pushed back to a system clock interval after the first universal time source time signal 410. In some embodiments, the maximum advance may be specified based on the specifications or requirements of the base station 110. For example, an entity operating the base station 110 may define the maximum advance to half the distance between successive universal time source time signals 410. In other embodiments, the maximum advance may correspond to a maximum extension range provided by the specifications or requirements of the base station 110. As described above, the maximum extension range may be specified from the original range of the service region 210 to almost double the original range of the service region 210. It should be noted that the maximum advance corresponds to an advance in the universal time source time signal 410 that may be just under a 100%. A 100% advance in the universal time source time signal 410 would equate the advanced clock signal 420 to the universal time source time signal 410 thereby providing no difference between the advanced clock signal 420 and the universal time source time signal 410. An advance of more than 100%, for example 110%, would result in only a 10% advance of the universal time source time signal 410.

Figure 7:
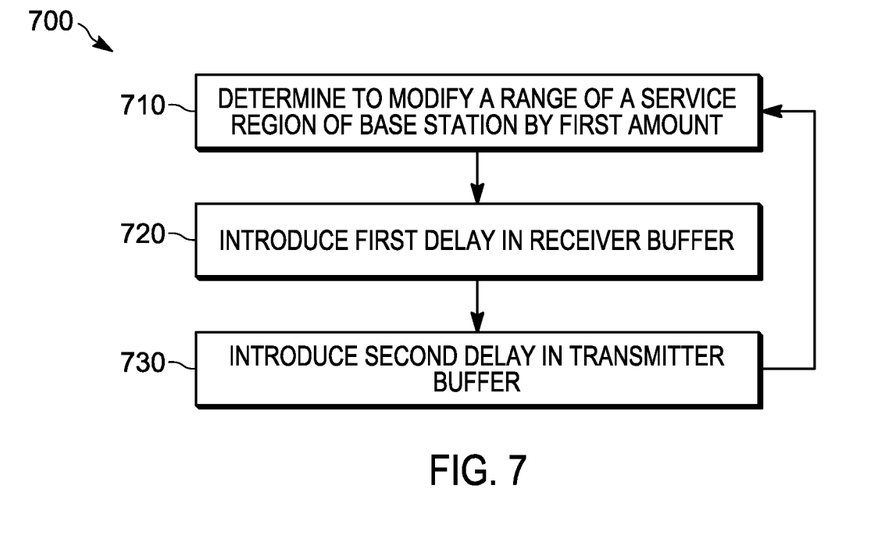
FIG. 7 is a flowchart of a method of dynamic range extension of a base station in accordance with some embodiments.

FIG. 7 illustrates a flowchart of an example method 700 for dynamic range extension of the base station 110. In the example illustrated, the method 700 includes determining, with the electronic processor 310, a first amount by which to modify a range of the service region 210 of the base station 110 (at block 710). The electronic processor 310 may determine the first amount based on movement of the mobile communication device 120 connected to the base station 110. First, the electronic processor 310 determines a change in location of the mobile communication device 120 when in communication with the base station 110. That is, the electronic processor 310 may determine whether the mobile communication device 120 is moving out of the service region 210 of the base station 110 (for example, towards or away from the base station 110). For example, the mobile communication device 120 moves from a first location to a second location away from the base station 110. The electronic processor 310 determines the first amount such that the second location (that is, the mobile communication device 120 in its new location) is within the service region 210 of the base station 110. This may involve extending the service region 210 by an amount (that is, the first amount) corresponding to the distance between the first location and the second location.

The method 700 also includes introducing, with the electronic processor 310, a first delay in the receiver buffer 610 (at block 720). The electronic processor 310 may adjust one of the read pointer and the write pointer of the receiver buffer 610 corresponding to the first delay to introduce the first delay in the receiver buffer 610. For example, the electronic processor 310 determines the read pointer based on the formula: Read Pointer=Write Pointer−(Maximum Advance—Desired Advance) and provides the read pointer to the receiver buffer 610.

The method 700 further includes introducing, with the electronic processor 310, a second delay in the transmitter buffer 620 (at block 730). The electronic processor 310 may adjust one of the read pointer and the write pointer of the transmitter buffer 620 corresponding to the second delay to introduce the second delay in the transmitter buffer 620. For example, the electronic processor 310 determines the read pointer based on the formula: Read Pointer=Write Pointer−(Maximum Advance—Desired Advance) and provides the read pointer to the transmitter buffer 620. In some embodiments, the second delay is the same amount as the first delay.

The method 700 repeats for every detected change in location of the mobile communication device 120 until the mobile communication device 120 is out of the maximum extendable service region 210 of the base station 110 or when the mobile communication device 120 is handed-off to a neighboring cell.

In some embodiments, the base station 110 may include a plurality of sectors, each sector having a corresponding antenna. Referring to FIG. 6, each sector additionally includes a transceiver 330, a modulator-demodulator 340, a receiver buffer 610, a transmitter buffer 620, a receiver counter 630, a transmitter counter 640, a receiver pointer 650, and a transmitter pointer 660. The method 700 may be independently implemented on the plurality of sectors to allow multiple independent range windows of service region 210.

For example, the first delay and the second delay are introduced to modify the range of the service region 210 of a first sector from the plurality of sectors. A second sector from the plurality of sectors includes a second transceiver 330, a second modulator-demodulator 340, a second receiver buffer 610, a second transmitter buffer 620, a second receiver counter 630, a second transmitter counter 640, a second receiver pointer 650, and a second transmitter pointer 660. The electronic processor 310 determines a second amount by which to independently modify a second range of a second service region 210 of the second sector. To modify the second range of the second service region 210, the electronic processor 310 introduces a third delay in the second receiver buffer 610 corresponding to the second amount and introduces a fourth delay in the second transmitter buffer 620 corresponding to the second amount as described above.

When a mobile communication device, for example, mobile communication device 120 or 121, moves between cells, dynamic range extension as described above helps in providing a smooth handoff and results in fewer dropped connections. By advancing the PN code, the base station 110 appears stationary to the mobile communication device even when the mobile communication device is moving away from the base station 110. Accordingly, when switching cells, the mobile communication device 120 may be connected to a base station of the first cell until the mobile communication device 120 enters the service region of a base station of a second cell. The mobile communication device 120 may then establish a communication connection to the base station 110 of the second cell.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A base station modem for dynamic range extension of a base station, the base station modem comprising:
 a modulator-demodulator configured to be coupled to a transceiver of the base station;
 a clock buffer configured to receive a universal time source time and to provide a clock signal to the modulator-demodulator, wherein the clock signal is an advanced time of the universal time source time;
 a receiver buffer coupled between the modulator-demodulator and the transceiver configured to receive data signals from the transceiver and provide the data signals to the modulator-demodulator;
 a transmitter buffer coupled between the modulator-demodulator and the transceiver configured to receive data signals from the modulator-demodulator and provide the data signals to the transceiver; and
 an electronic processor coupled to the modulator-demodulator, the clock buffer, the receiver buffer, and the transmitter buffer and configured to:
  determine a first amount by which to modify a range of a service region of the base station;
  introduce a first delay in the receiver buffer corresponding to the first amount; and
  introduce a second delay in the transmitter buffer corresponding to the first amount.

2. The base station modem of claim 1, wherein the electronic processor is further configured to:
 introduce a maximum advance between the clock signal and the universal time source time such that the range of the service region is at a maximum extension range.

3. The base station modem of claim 2, wherein the first delay and the second delay are selected to decrease the range from the maximum extension range and to correspond to the first amount.

4. The base station modem of claim 1, wherein the electronic processor is further configured to:
 determine a change in location of a mobile communication device in communication with the base station, wherein the first amount is determined such that the mobile communication device is within the service region of the base station.

5. The base station modem of claim 1, wherein the electronic processor is further configured to:
 adjust one of a read pointer and a write pointer of the receiver buffer corresponding to the first delay to introduce the first delay in the receiver buffer.

6. The base station modem of claim 1, wherein the electronic processor is further configured to:
 adjust one of a read pointer and a write pointer of the transmitter buffer corresponding to the second delay to introduce the second delay in the transmitter buffer.

7. The base station modem of claim 1, wherein the base station further comprises a plurality of sectors and wherein the first delay and the second delay are introduced to modify the range of the service region of a first sector of the plurality of sectors, a second sector from the plurality of sectors comprising:
 a second modulator-demodulator configured to be coupled to a second transceiver of the base station;
 a second receiver buffer coupled between the second modulator-demodulator and the second transceiver configured to receive data signals from the second transceiver and provide the data signals to the second modulator-demodulator;
 a second transmitter buffer coupled between the second modulator-demodulator and the second transceiver configured to receive data signals from the second modulator-demodulator and provide the data signals to the second transceiver; and
 the electronic processor coupled to the second modulator-demodulator, the clock buffer, the second receiver buffer, and the second transmitter buffer and further configured to:
  determine a second amount by which to modify a second range of a second service region of the second sector;
  introduce a third delay in the second receiver buffer corresponding to the second amount; and
  introduce a fourth delay in the second transmitter buffer corresponding to the second amount.

8. A method for dynamic range extension of a base station, the method comprising:
 determining, with an electronic processor of a base station modem of the base station, a first amount by which to modify a range of a service region of the base station;
 introducing, with the electronic processor, a first delay in a receiver buffer coupled between a modulator-demodulator of the base station modem and a transceiver of the base station, the first delay corresponding to the first amount; and
 introducing, with the electronic processor, a second delay in a transmitter buffer coupled between the modulator-demodulator and the transceiver, the second delay corresponding to the first amount.

9. The method of claim 8, further comprising:
 receiving, with a clock buffer coupled to the electronic processor and the modulator-demodulator, a universal time source time; and
 providing, with the clock buffer, a clock signal to the modulator-demodulator, wherein the clock signal is an advanced time of the universal time source time.

10. The method of claim 9, further comprising:
 introducing a maximum advance between the clock signal and the universal time source time such that the range of the service region is at a maximum extension range.

11. The method of claim 10, wherein the first delay and the second delay are selected to decrease the range from the maximum extension range and to correspond to the first amount.

12. The method of claim 8, further comprising:
 determining a change in location of a mobile communication device in communication with the base station, wherein the first amount is determined such that the mobile communication device is within the service region of the base station.

13. The method of claim 8, wherein introducing the first delay in the receiver buffer further comprises:
 adjusting one of a read pointer and a write pointer of the receiver buffer corresponding to the first delay.

14. The method of claim 8, wherein introducing the second delay in the transmitter buffer further comprises:
 adjusting one of a read pointer and a write pointer of the transmitter buffer corresponding to the second delay.

15. The method of claim 8, wherein the base station includes a plurality of sectors and wherein the first delay and the second delay are introduced to modify the range of the service region of a first sector of the plurality of sectors, the method comprising:
- determining a second amount by which to modify a second range of a second service region of a second sector from the plurality of sectors;
- introducing a third delay in a second receiver buffer coupled between a second modulator-demodulator of the second sector and a second transceiver of the second sector, the third delay corresponding to the second amount; and
- introducing a fourth delay in a second transmitter buffer coupled between the second modulator-demodulator and the second transceiver, the fourth delay corresponding to the second amount.

* * * * *